April 27, 1954     L. GAGNAIRE     2,676,670
PROCESS FOR THE PURIFICATION OF GASES
Filed Nov. 14, 1949     2 Sheets-Sheet 1

Inventor:
LOUIS GAGNAIRE
By Wenderoth, Lind & Ponack
ATTORNEYS

April 27, 1954 — L. GAGNAIRE — 2,676,670
PROCESS FOR THE PURIFICATION OF GASES
Filed Nov. 14, 1949 — 2 Sheets-Sheet 2
Fig_2
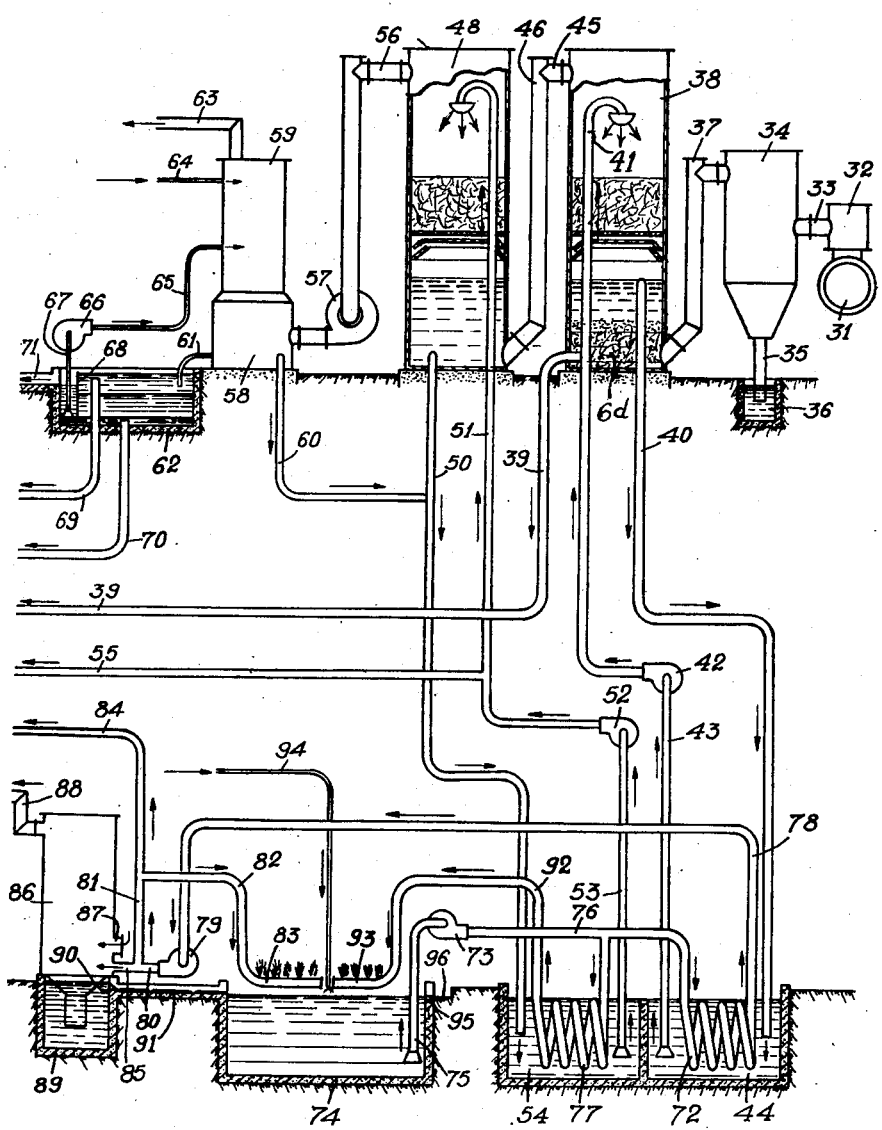
Inventor:
Louis Gagnaire
By
Wenderoth, Lind + Ponack
ATTORNEYS Patented Apr. 27, 1954

2,676,670

UNITED STATES PATENT OFFICE 2,676,670

PROCESS FOR THE PURIFICATION OF GASES

Louis Gagnaire, Paris, France, assignor to Heat and Industry Inc., New York, N. Y., a corporation of New York Application November 14, 1949, Serial No. 126,948

Claims priority, application France November 30, 1948

2 Claims. (Cl. 183—120)

Gaseous products, especially those originating from fuel gas production plants such as gas generators, usually carry a small amount of solid matter in a powdered state and liquid substances in suspension in the shape of small vesicles, and which are dispersed as liquids, or in the vapor phase.

The purification of these gases is accomplished by blowing the gases through dust remover devices, such as cyclones or electro-static cleaners. The elimination of condensable liquid substances is effected in recovery towers simultaneously with the cooling of the gases and some of the gaseous components may be eliminated by washing.

The purification of the recovered liquids from the condensation of the vaporized products and of the cleansing liquids has been generally neglected in the processes hitherto in use in fuel gas production plants. These liquids were looked upon as being only by-products, and where purification of the by-product was to be carried out, it required the operation of additional plant and necessitated additional expenditure.

The object of the present invention is to provide a process for the purification of a fuel gas freed from dust and containing liquid substances in suspension in the shape of small vesicles or in the vapor phase, which provides for simultaneously obtaining a purified and cooled fuel gas and the condensed liquid substances ready for immediate use, such as, for example, moisture-free tar pitch and tars, light and medium anthracene oils, etc. from the purification of fuel gas produced by a generator gas.

A further object of the invention is to provide a process for the purification of gases of the character described, in which the step of washing the gas freed from dust is carried out by means of a countercurrent flow of a liquid including at least one of the condensable substances contained in the fuel gas, such as the oily substances from generator gas, said liquid being obtained during the purification of said fuel gas.

Another object of the invention is to provide, in a process for the purification of fuel gases of the character described, for the utilization of the sensible heat of the fuel gas to be purified for obtaining the separation due to the difference in boiling range of the condensable substances contained in the gas.

Another object of the invention is to provide, in a process for the purification of fuel gases of the character described, the step of bubbling the fuel gas, before purification, through a liquid including at least a part of the condensable substances contained in a previously purified mass of the same fuel gas.

Another object of the invention is to provide, in a process for the purification of fuel gases of the character described, the step of washing the fuel gas freed from dust through a fractionating tower by means of a countercurrent flow of the liquid formed by the light condensed fraction of the condensable substances contained in the gas, said fraction being obtained either after decantation of said condensed substances or after condensation of the same at a suitable level of said tower, and being further submitted to a cooling operation before its utilization for said washing operation.

A further object of the invention is to provide, in a process for the purification of fuel gases of the character described, the step of adding to the cleansing liquid when circulating a mixture of condensed liquid substances obtained in neighboring plants used for the same fuel gas as condensation plants only without separation of said liquid substances.

This process for the purification of fuel gases offers the advantage of a more favorable thermal balance of the purifying operations, resulting in a substantial reduction of costs, since the sensible heat of the fuel gas to be purified is used in the fractionation of the condensate, this operation heretofore being carried out separately.

Thus, the equipment required for carrying out the present method is by far less expensive and less cumbersome.

In particular embodiments of plants for carrying out said process, the heat-exchangers may be fitted in vessels used for cooling the washing liquid in order to supply the "process" hot water where it may be used. Also, a part of the recovered heat can be utilized for saturating the feed-air supplied to the gas generators with aqueous vapor.

The following description, considered with the accompanying drawings, are given as non-limiting examples, and will enable the particular features and operation of the invention to be readily understood.

In the drawings:

Figure 2 is a schematic representation of a plant for purifying generator or producer gas according to the invention.

Figure 1:
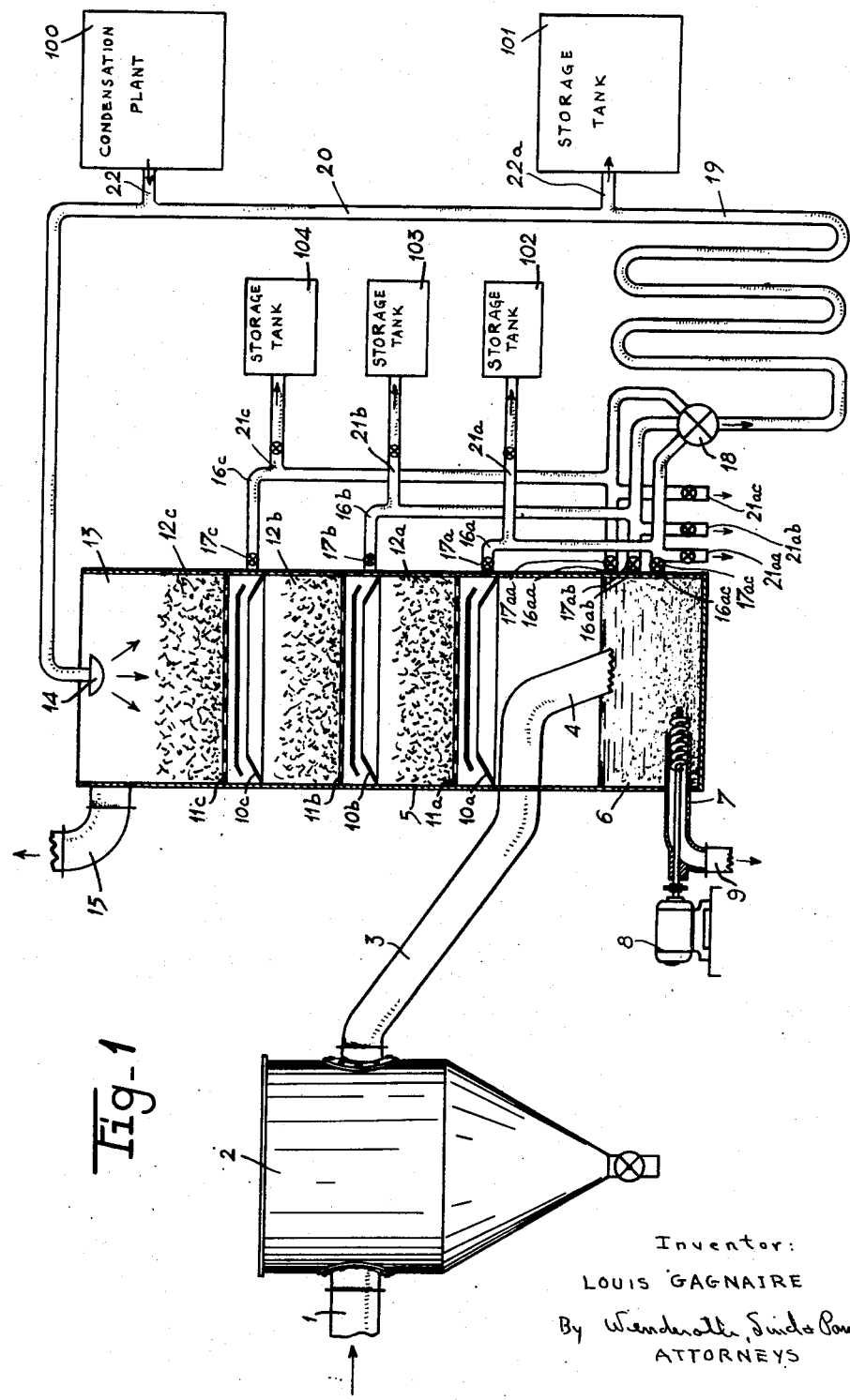
Figure 1 shows a schematic sketch of a plant for purifying gases according to the invention.

The purifying apparatus illustrated in Figure 1 comprises a gas inlet-pipe 1, leading the gas from the fuel gas producer into a dust-remover 2, from which a pipe 3 exhausts the gas freed from dust.

The fuel gas freed from dust passes through a pipe 4 to the bottom of a fractionating tower 5 said bottom being formed as a bubble vat 6. On the bottom of the bubble vat 6, an extractor 7, driven by a motor 8, provides for the elimination of the heavy solid and paste-like condensate through outlet pipe 9. Over the pipe 4 a bubble tray 10 is fitted. Over the bubble tray there is provided a perforated grate 11 for carrying a packing 12. The packing 12 may be formed of pottery, as hurdles or as rings. Over the packing 12 is a spraying-chamber 13, where the spraying of the cleaning liquid is carried out by a sprayer 14, placed on the top of the tower, said spraying chamber 13 being connected with the further part of the gas-treating plant by an outlet pipe 15.

The single fractionating tower may consist of a series of bubble trays 10a, 10b and 10c, as illustrated in Fig. 1, with interspaces sufficient for the efficient cleansing of the fuel gases. Drain pipes 16a, 16b, 16c, 16aa, 16ab and 16ac are fitted into the tower on levels chosen conveniently to correspond to the bubble trays 10, 10b and 10c, and to the top-section of the bubble vat 6. These pipes 16a, 16b, 16c, 16aa, 16ab and 16ac are fitted with adjusting valves 17a, 17b, 17c, 17aa, 17ab and 17ac, and said pipes are together connected with the inlet port of a pump 18. This pump feeds a cooler 19 the outlet pipe 20 of which is connected to the sprayer 14.

Drain pipes 21a, 21b, 21c, 21aa, 21ab and 21ac, are fitted on pipes 16a, 16b, 16c, 16aa, 16ab and 16ac etc. in order to secure the regulated discharge of the cleansing liquid. A pipe 22 fitted on pipe 20 allows to introduce into the cleansing liquid cleansing liquids proceeding from contiguous washing or condensation plant 100 without separation of condensed liquids. A pipe 22a is used for drawing-off liquid from pipe 20, either before, or after the cooler 19 or to direct the same towards a tank 101.

The operation of the apparatus is as follows:

The dust free gas flows through pipe 4 and bubbles in the bubble vat 6, passing across the liquid contained in said bubble vat. The hot gas flows through fractionating tower 5, from the bottom towards the top, coming in contact with the liquid dispersed by the sprayer 14. The gas temperature decreases as the gas progresses up towards the outlet-pipe 15. The various condensable products are condensed and descend with the cleansing liquid. The gas leaves the outlet pipe 15 in a washed and purified state, at a temperature controlled by the cooler 19.

From the washing liquid, the dust particles not retained by the dust-remover 2 and the viscous tars condense on the bubble trays 10a, 10b and 10c, the type and nature of these fractions being determined by the temperature prevailing at the level of said trays. These fractions can be separately drawn off and conveyed to utilization plants 102, 103 and 104 through pipes 21a, 21b and 21c, certain parts of the thus condensed liquids being drawn off and delivered to the cooler 19 and therefrom to the sprayer 14 by means of pump 18. The condensations of heavy fractions take place in the bubble vat 6 and the extraction of said fractions from the latter is accomplished by the extractor 7. The cleansing liquid originates mainly from the condensation of the vapor contained in the fuel gas.

Mixtures of liquids, of a type similar to the above mentioned cleansing liquid, e. g. originating from washing or condensation plants such as condensation plant 100, which are not equipped with purifying apparatus for the cleansing liquid, may be introduced into the circulating liquid in pipe 20, by the tube 22. This liquid mixture is fractionated within the fractionating tower and its components can be easily recovered with the other fractions. The liquid mixture may be fed into the circuit either before or after the cooler 19.

The thus applied process permits the use of the sensible heat contained in the treated gases, for the purpose of purifying by fractional distillation each of the liquid substances forming the liquid that serves for washing the gases. Purification of the condensate is thus more economical as in a battery of fuel gas purifying apparatus, only a limited number of simultaneous and mutual purifying units are required, these units effecting the purification of each one of the liquids used in the conventional neighboring condensation plants, as well as of the gases flowing through the said purifying plant.

This process is particularly applicable to the washing of fuel gases produced by gas generators and leads to an easy separation of the tar pitch, tars and anthracenic oils and consequently to their purification.

The equipment illustrated in Fig. 2 and relating to the purification of such gases comprises a pipe 31, letting in the crude fuel gas, connected with a safety valve 32, the outlet-pipe 33 of which is connected with a dry dust remover 34. The separated dust may be expelled through an outlet tube 35 and a water-drain 36.

The gas outlet pipe 37 of the dust remover 34 terminates at the bottom of a fractionating tower 38 of the type of the tower hereinabove described with reference to Fig. 1. Within said tower 38 is mounted a lower bubble vat 6d, the bottom of which is fitted with a duct 39 for the evacuation of the condensed tar pitch, while the top thereof is equipped with a pipe 40 for removing the condensed heavy gas-tar. This tower is partly filled by a device for spraying a cleansing liquid and contains one bubble tray. On its upper part is fitted an inlet tube 41, for the cooled heavy gas-tar, taken up by a pump 42 and a suction pipe 43 in a cooling vat 44 for tar, into which the pipe 40 terminates.

The upper part of tower 38 is fitted with a gas outlet junction 45 which is connected, through pipe 46, with the lower part of a second tower 48, similar to the fractionating tower 38. On the lower part of said tower 48 is fitted a duct 50 for discharging the condensed light gas-tar while the upper part thereof receives the cooled light gas-tar through a pipe 51. On said pipe 51 a pump 52 is inserted, the suction duct 53 of which is immersed into a light tar cooler-vat 54, whereinto the hot condensed light gas-tar arrives through the duct 50. Tower 48 is arranged in a way substantially identical to that of column 38, but it does not comprise any tar pitch extractor.

On the pipe 51 is fitted a controllable evacuation duct 55 for the light gas-tar, which is, like the tar-pitch, one of the purified products of the plant, fit for immediate commercial use.

The upper part of tower 48 is fitted with a suction pipe-socket 56 for the gases that flow through the dust-remover 34 and the towers 38 and 48. This suction is to be effected by an extractor 57 that forces the sucked-in gases into a baffle-box 58. On the top of this box stands a wet-process separator and washer 59. The bottom of said box bears a tube 60 which conveys the substances, retained in the box, into the duct 50 where the hot light tar is circulating. On the washer 59, at a place opposed to the inlet of the gases into the baffle-box 58, an oil evacuation pipe 61 is fitted for conveying the condensed oils into a decantation tank 62. On the top of the washer 59 is fitted a tube 63 conveying the purified and washed gas to its utilization. The washer 59 is fed at its top with fresh water by a pipe 64, and in its middle section with recycled water through a tube 65. Said recycled water is taken up by a pump 66 having a suction duct 67 entering it at the convenient level and behind a vertical partition 68, into the tank 62. Said tank is used at the same time as a separator of light oil, water and medium oil, of which the levels settle from the bottom upwards, in the order of their decreasing densities, the water-layer being in the middle. Into the same tank 62, at the respectively convenient levels, there are provided a tube 69 evacuating the light oil and a tube 70 evacuating the medium oil, said both substances being also purified products of the plant ready for immediate use. Behind the partition 68, a drain 71 secures the discharge of the excess of water.

In the tar cooler 44, consisting of a vat, is immersed a heat exchanger 72, through which water is circulating in a direction shown by the arrows. Said water is taken up by a pump 73 from a water tub 74, whereinto is immersed the suction pipe socket 75 of said pump 73. The inlet pipe 76 of the heat exchanger 72 is fitted also to the inlet pipe of a heat exchanger 77 which is immersed into the hot light-tar contained in the cooler 54.

The outlet pipe 78 of the exchanger 72 terminates in the suction duct of a hot water pump 79. The delivery duct 80 of the hot water pump terminates in a tube 81 which is separated into two branches: a water feed-pipe 82 for the spraying nozzles of a water cooler situated over the tub 74, and a feed pipe 84, for the hot water utilization circuits. Tube 80 comprises also a branch 85, which is a water-feed pipe of an air saturator 86. Said saturator comprises an inlet 87 for dry air and an outlet 88 for saturated air and is erected over a vat 89, which serves as a receptacle for the excess of the injected hot water. The said vat is fitted with an overflow 90, that leads to a ditch 91, conducting the excess of hot water into the vat 74.

The outlet junction 92 of the heat exchanger 77 terminates in the spraying nozzles 93 of a cooler, set in a similar way as the cooler 83, over the vat 74. A water feed pipe 94 located over said vat 74 supplies the complement of cold water needed.

Said vat 74 is provided with an overflow 95, conducting the eventual excess of water into a drain 96.

The operating of the described set of apparatus is as follows:

The gas coming in through the pipe 31 is freed from dust in a "dry" manner, within the dust remover 34 and arrives in the hot state at the bottom of the tower 38 and bubble vat 6d. The bubble vat 6d is filled with the oily substances carried by the gas and condensed in the tower 38. The lower part of the bubble vat receives the water-free tar pitch which is extracted by the pipe 39. The temperature of the tar pitch at this state is sufficient to distill the "light" (low boiling) substances contained therein. The distillation products are thus obtained in the vapor state and come into contact with the impurities such as dust, liquid vesicles contained in the gas which are in a corpuscular form. These corpuscles constitute condensation nuclei; they bear an electric charge and the drops of liquid which close around them drive them back to the bottom of the tower. The condensed heavy gas-tar floating on the tar pitch is taken by the pipe 40 and is cooled in a cooler 44 which is in contact with the exchanger 72. The cooled heavy gas-tar is sucked and propelled by pump 42 to the spraying nozzle at the top of tower 38 through tube 41. Said spraying produces an initial purification of the gas since it promotes the condensation of the liquid substances which are condensed at the temperature existing in the tower 38. This initial purifying process is followed by another one which is carried out in a similar way within tower 48, where the light gas-tar is condensed. This condensed light gas-tar is conveyed, through duct 50, to the cooler 54. After it is cooled down it is sent back, by pump 52 and pipe 51, to the sprayers of tower 48. The hot light tar is joined through pipe 60 by light-tar condensed in the baffle-box 58. The condensation takes place in step with the cooling down of the gas.

After separation of the gas-tars, the gas is subjected to a wet washing in the washer 59, from which a mixture of oils and water is recovered through pipe 61. The purified and washed gas, as soon as it has considerably cooled down, exits through the tube 63.

The mixture of water and oils is decanted into the tank 62 and the light and medium oils are sent to their utilization through tubes 69 and 70.

The hot water, originating from the coolers 77 and 72, is used in particular for the conditioning of the saturated air, needed, among other uses, in the operation of gas generators, the remaining hot water being conveyed to its utilization by pipe 84.

As the above description shows, the plant is capable of supplying, as useful products: tar-pitch, completely free of moisture and of too light components, further: heavy-tars, light-tars, medium and light oils, hot water and saturated air.

It provides thus the means, without any additional expenditure, for an easy recovery of heat and products, which normally are not supplied by existing plants directly, ready for commercial use, without undergoing to that effect an after-treatment.

It is obvious that within the limits of this invention, all suitable changes to the above described embodiments may be effected. The cooler, in particular, could consist of a recovery boiler.

What I claim is:

1. A process for the purification of a dust free fuel gas obtained from a gas generator and containing condensable liquid substances dispersed therein as vesicles or vapor, comprising bubbling the dust free fuel gas through a mixture of tar pitch and heavy gas-tar which is obtained during the previous purification from the same fuel gas in which the liquid vesicles have been condensed, circulating said fuel gas after said bubbling treatment along an ascending path above said mixture while cooling the same for condensing the heavy gas-tar vapor contained therein, collecting the thus condensed heavy gas-tar in said mixture, drawing off at least a part of the tar pitch contained in said mixture ready for immediate use, drawing off at least a part of the condensed heavy gas-tar contained in said mixture and thereafter cooling said drawn off part of heavy gas-tar, returning said cooled heavy gas-tar to the ascending path of the fuel gas in spray form at a point near to the top of said path for washing and cooling said fuel gas in a counter-current direction to said path, circulating the fuel gas freed from heavy gas-tar and from tar pitch along a second ascending path while cooling the same for condensing the major portion of the light gas-tar vapor contained therein, mechanically precipitating the residual light gas-tar contained in the fuel gas when the same has circulated along said second ascending path, collecting the light gas-tar condensed along said second ascending path and mechanically precipitated, cooling said collected light gas-tar, drawing off at least a part of said cooled light gas-tar ready for immediate use, returning the remaining portion of said cooled light gas-tar to the second ascending path of the fuel gas in spray form at a point near the top of said second path for washing and cooling said fuel gas in a counter-current direction to said second path, washing the fuel gas freed from tar pitch and gas-tars with water for condensing the anthracene oil vapor contained in said fuel gas, collecting the thus purified gas, collecting the liquid mixture obtained during said last washing operation, decanting said mixture, and extracting from the thus decanted mixture successive fractions of increasing densities of light anthracene oil, water and medium anthracene oil, said oils being ready for immediate use while said water is suitable for recycling in subsequent washing operations.

2. A process for the purification of fuel gas, according to claim 1, wherein the tar pitch submitted to the sensible heat of the gas to be purified loses by distillation the oily and tarry substances it may contain.

References Cited in the file of this patent

UNITED STATES PATENTS

| Number | Name | Date |
|---|---|---|
| 931,868 | Hegeler et al. | Aug. 24, 1909 |
| 963,401 | Solvay | July 5, 1910 |
| 1,346,967 | Mueller | July 20, 1920 |

FOREIGN PATENTS

| Number | Country | Date |
|---|---|---|
| 309,158 | Germany | May 6, 1922 |
| 378,222 | Great Britain | Aug. 11, 1932 |